United States Patent [19]

Ennis

[11] 4,225,995
[45] Oct. 7, 1980

[54] BRUSH ASSEMBLY FOR VEHICLE WASHING APPARATUS HAVING A FLEXIBLE ELASTIC COUPLING

[75] Inventor: George T. Ennis, Playa Del Rey, Calif.

[73] Assignee: N/S Car Wash Enterprises, Inc., Sharon, Pa.

[21] Appl. No.: 883,514

[22] Filed: Mar. 6, 1978

[51] Int. Cl.$^2$ .............................................. B60S 3/06
[52] U.S. Cl. ............................. 15/53 AB; 15/DIG. 2
[58] Field of Search ............ 15/DIG. 2, 53 A, 53 AB

[56] References Cited

U.S. PATENT DOCUMENTS

| | | | |
|---|---|---|---|
| 3,428,983 | 2/1969 | Seakan | 15/53 A |
| 3,434,172 | 3/1969 | Wilson | 15/53 AB |
| 3,720,972 | 3/1973 | Ennis | 15/53 AB |
| 3,747,151 | 7/1973 | Takeuchi | 15/53 A |
| 3,806,978 | 4/1974 | Takeuchi | 15/53 AB |
| 3,868,740 | 3/1975 | Brovig | 15/53 A |
| 3,881,208 | 5/1975 | Miner | 15/53 AB |
| 3,908,219 | 9/1975 | Chapman | 15/53 AB |

FOREIGN PATENT DOCUMENTS

| | | | |
|---|---|---|---|
| 1787014 | 5/1974 | Fed. Rep. of Germany | 15/DIG. 2 |
| 2006596 | 12/1969 | France | 15/DIG. 2 |

*Primary Examiner*—Edward L. Roberts
*Attorney, Agent, or Firm*—Schuyler, Birch, McKie & Beckett

[57] ABSTRACT

A rotating brush assembly for a vehicle washing apparatus is disclosed in which the brush assembly, which includes a brush, a brush shaft supporting the brush, a brush motor for driving the brush shaft and a flexible elastic coupling, is permitted to swing or tilt in response to the force exerted on the brush by the movement of the vehicle relative to the vehicle washing apparatus. The flexing of the flexible elastic coupling, which couples the brush shaft to the support arm, permits the brush to tilt or swing in any direction. For example, when the brush assembly engages the front of a vehicle, the flexible elastic coupling permits the brush to tilt as it passes along the front end of the vehicle. The brush motor rotates the brush in a direction which causes the brush to walk along the front of the vehicle. As a result, the cooperative action of the rotary reaction force of the brush and the flex of the flexible elastic coupling causes the brush to turn the front corner of the vehicle and pass along the side of the vehicle. Similarly, the flex of the flexible elastic coupling together with the rotary reaction force of the brush against the vehicle enables the brush to wash the side and turn the rear corner to wash the rear of the vehicle.

32 Claims, 10 Drawing Figures

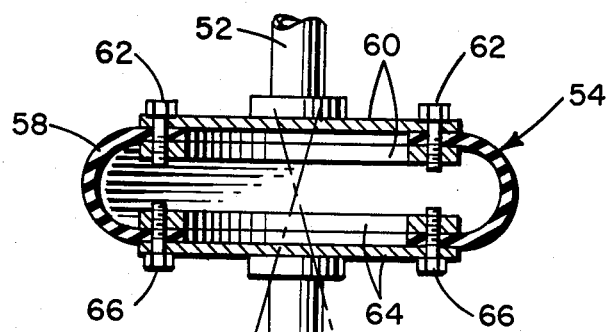
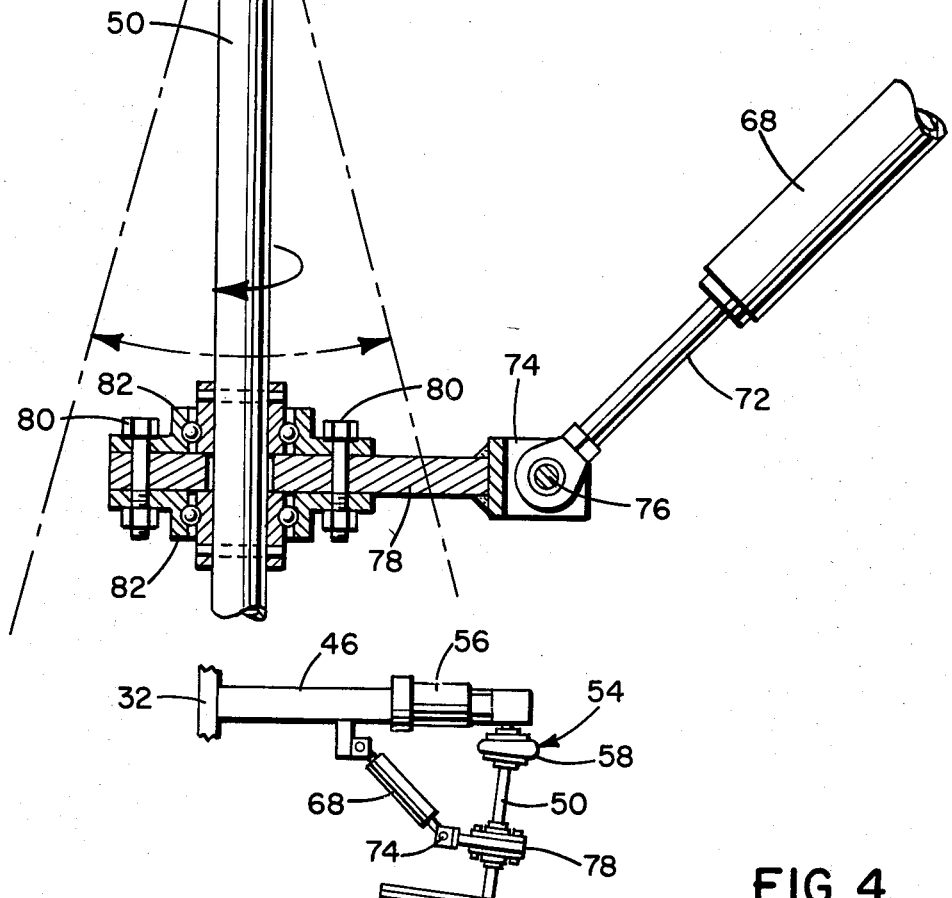
FIG. 3
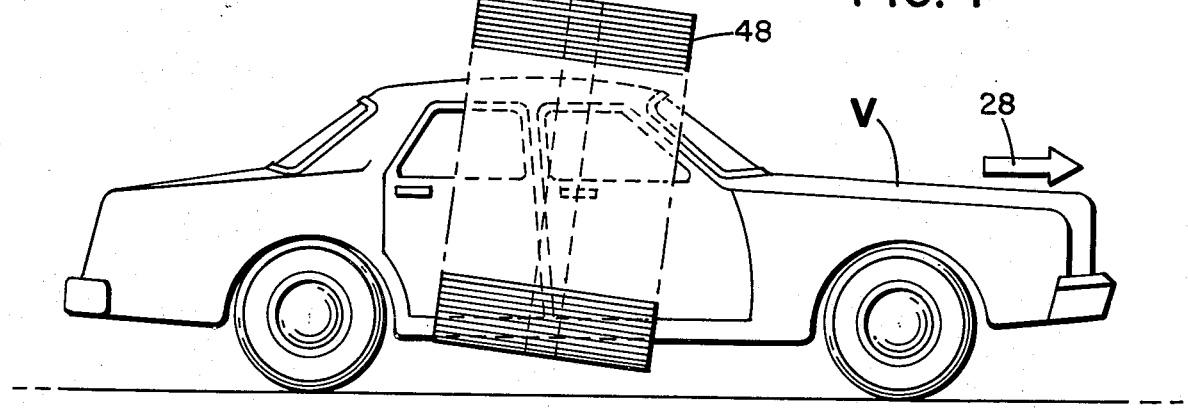
FIG. 4

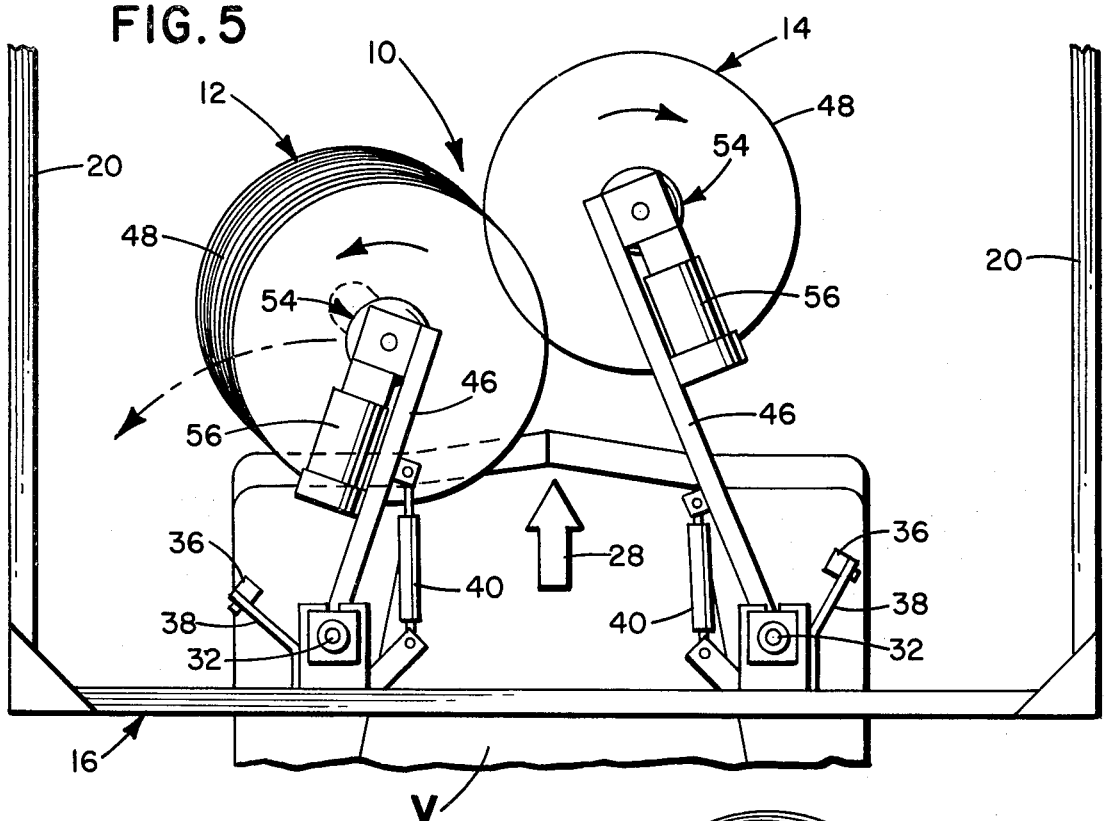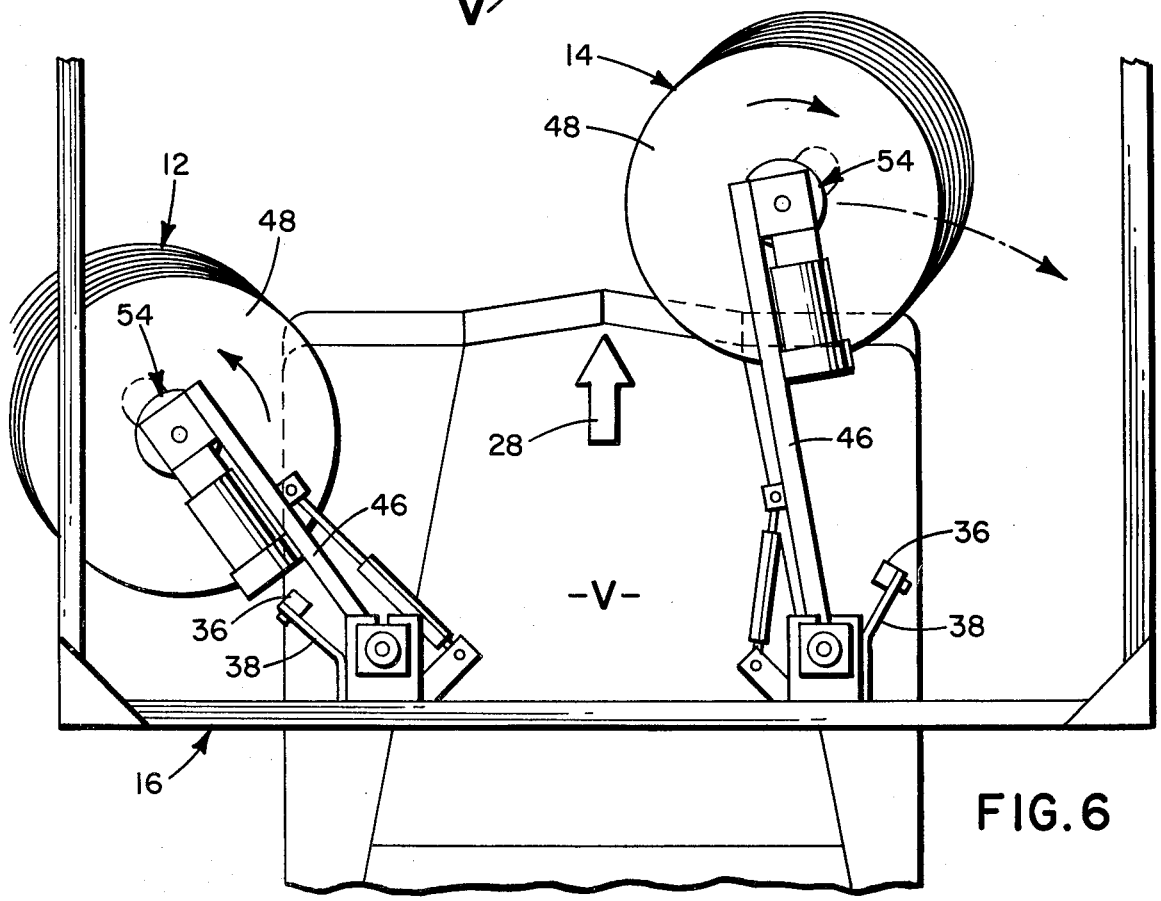

BRUSH ASSEMBLY FOR VEHICLE WASHING APPARATUS HAVING A FLEXIBLE ELASTIC COUPLING

BACKGROUND OF THE INVENTION

1. Field of the Invention

This invention relates generally to vehicle washing apparatus and, more particularly, to a vehicle washing apparatus employing one or more rotating brush assemblies for automatically cleaning one or more of the front, sides and back of a vehicle.

2. Description of the Prior Art

Numerous devices are known in the art for washing vehicles by employing rotating brush assemblies for cleaning one or more of the front, sides and back of a vehicle. Most of these prior art devices are complicated in construction and require the use of extensive power control systems to effect a proper movement of the brush assembly to effectively clean the vehicle. For example, in wrap-around rotating brush assemblies, hydraulic power control systems are often used to move the brush assemblies along the front, side and back of a vehicle. Such hydraulic power control systems require close supervision and extensive maintenance and adjustment in order to operate properly. Consequently, most of the vehicle washing apparatus presently available have been expensive to construct, operate and maintain.

Various solutions to many of the above problems have recently been proposed. For example, a vehicle wrap-around cleaning apparatus is disclosed in U.S. Pat. No. 3,720,972 issued to the above-named inventor on Mar. 20, 1973, in which a brush assembly with an articulated arm is used to wash the front, side and rear of a vehicle. The articulated arm is biased by various springs and shock absorbers to enable the brush assembly to pass along the front, side and rear of the vehicle without the use of any complicated power control system. The brush is rotated in a direction whereby the reaction force of the brush against the vehicle together with the biasing of the various springs causes the brush to move itself and walk along the front, side and rear surfaces of the vehicle. Although the washing apparatus described in the above patent considerably reduces the construction, operation and maintenance problems previously associated with rotating brush assemblies in vehicle washing apparatus, further simplifications of such rotating brush assemblies are highly desirable.

SUMMARY OF THE INVENTION

One of the objects of the present invention is to avoid the disadvantages of the prior art vehicle washing apparatus mentioned above by providing a vehicle washing apparatus which is compact, inexpensive and efficient due to simplicity of construction. This vehicle washing apparatus can be used to wash cars, buses, trucks, trains, etc. In this regard, it is an object of the present invention to eliminate the need for articulated support arms for vehicle wrap-around brush assemblies as well as to eliminate the need for any hydraulic or other power control systems for controlling the movement of such brush assemblies along the front, side and rear of the vehicle. It is an object of the present invention to provide a rotating brush assembly which is capable of washing one or more of the front, side and rear of the vehicle without the use of any positive action power control system for moving the brush assembly relative to the position of the vehicle. In this regard, it is an object of the present invention to provide a brush assembly which is simple in design yet capable of moving itself around the vehicle being washed due to the relative movement of the vehicle with respect to the washing apparatus.

It is noted that a further object of the present invention is to provide an improved rotating brush assembly which may be mounted on either a fixed support structure wherein the vehicle moves relative to the fixed support structure or a movable support structure wherein the movable support structure moves relative to the stationary vehicle. Along these same lines, it is yet another object of the present invention to provide a brush assembly for a vehicle washing apparatus wherein the vehicle can travel in either direction relative to the support structure supporting the brush assembly by simply reversing the direction of rotation of the brush.

Another object of the present invention is to provide a brush assembly with a brush supported by a flexible elastic coupling which permits the brush to tilt or swing on impact with the surfaces of the vehicle. The primary object of the flexible elastic coupling is to cooperate with the rotating action of the brush against the surfaces of the vehicle to initiate the movement of the brush around the front and rear corners of the vehicle and along the side and rear of the vehicle, respectively. In this regard, it is an object of the present invention to control the movement of the brush along the front, side and rear of the vehicle in response to the rotating action of the brush and the flexing of the flexible elastic coupling upon impact with the vehicle.

A further object of the flexible elastic coupling is to accomodate the position of the vehicle in the vehicle washing apparatus so that it is not necessary for the vehicle to be exactly centered in order to operate properly. In this regard, it is an object of the present invention to provide a vehicle washing apparatus which does not require a track for the vehicle although simple guide rails may be provided for safety purposes. Because a track is not essential to the operation of the present invention, the vehicle washing apparatus can be used to wash both single wheeled and dual wheeled vehicles.

Still another object of the present invention is to provide a brush assembly with a brush supported by a flexible elastic coupling which absorbs shock and eliminates the possibility that the shaft supporting the brush will bend. It is a further object of the present invention to provide a flexible elastic coupling for a brush assembly which can be used as an improvement on existing brush assemblies which are supported on either the side or overhead portion of the frame of the vehicle washing apparatus.

It is yet another important object of the present invention to provide a rotating brush assembly which conforms to the contour of the vehicle being washed as a result of the flex of the flexible elastic coupling. As a result of this conformity to the contour of the vehicle, the washing efficiency of the vehicle washing apparatus is substantially improved and less stress is placed on the frame supporting the rotating brush assembly. Also, to further improve the washing efficiency of the vehicle washing apparatus of the present invention, it is an object to provide a brush for the rotating brush assembly which is shaped to conform to the contour of the vehicle.

Finally, it is an object of the present invention to provide a safety device for the brush of the rotating brush assembly of the present invention which prevents the brush assembly from tilting too freely and also protects the vehicle in the event the flexible elastic coupling breaks.

According to the present invention, a vehicle washing apparatus is provided in which a rotating brush assembly is supported by an overhead frame member to engage the front end of a vehicle whereby the relative movement of the vehicle and the rotating brush assembly enables the rotating brush to wash one or more of the front, side and rear of the vehicle. The rotating brush is rotated in a direction which causes the brush to move itself around the vehicle due to the reaction force of the rotating brush against the vehicle. In particular, the rotating brush of the present invention is supported by a flexible elastic coupling which permits the rotating brush to tilt or swing upon impact with the surfaces of the vehicle. The flexing or compression of the flexible elastic coupling cooperates with the reaction force of the brush against the vehicle to cause the brush to move itself around the vehicle.

In one embodiment of the present invention, the rotating brush assembly includes a brush support arm pivotably mounted on a transverse support bar which forms part of the frame of the vehicle washing apparatus. The brush support arm supports a brush motor which drives a motor shaft rotatably mounted on the brush support arm. The rotating brush is supported by a brush shaft which is coupled to the motor shaft by a shaft coupling device. The shaft coupling device includes a flexible elastic coupling and two pairs of coupling support plates which connect the flexible elastic coupling between the motor shaft and the brush shaft. The upper pair of coupling support plates is rigidly fastened to the motor shaft and the lower pair of coupling support plates is rigidly fastened to the brush shaft. The flexible elastic coupling generally is formed by a resilient material such as the rubber which forms an automobile tire. The shaft coupling device permits the brush and the brush shaft to tilt when the brush engages the surfaces of a vehicle. The brush motor drives the motor shaft which in turn rotates the brush in a direction whereby the reaction force of the brush against the surfaces of the vehicle causes the brush to move itself around the vehicle. For example, the tilting action of the brush and the brush shaft upon engagement with the front end of the vehicle causes the flexible coupling to flex or compress so that as the brush reaches the front corner of the vehicle, the combined action of the rotating brush and the flex of the flexible elastic coupling urges the brush around the front corner and along the side of the vehicle. Similarly, the flexible elastic coupling is flexed in a different direction as the brush passes along the side of the vehicle so that as the brush reaches the rear corner of the vehicle, the combined action of the rotating brush and the flex of the flexible elastic coupling urges the brush around the rear corner and along the rear end of the vehicle. Thus, the flexible elastic coupling of the brush assembly of the present invention permits the brush and the brush shaft to tilt or swing in all directions in order to enable the brush to wash one or more of the front, side and rear of the vehicle. In this embodiment, a shock absorber or damping cylinder also is fastened between the brush support arm and the brush shaft to prevent the brush from swinging too freely. Finally, two brush assemblies such as described above may be disposed opposite each other on each side of the vehicle washing apparatus whereby the brushes are initially in either an overlapping position or adjacent each other to wash the front, both sides, and the rear of the vehicle. When the brush assemblies are in the overlapping position, one brush support arm generally is longer than the other brush support arm. On the other hand, when the brush assemblies are adjacent each other the brush support arms generally are of the same length.

In yet another embodiment of the present invention, the brush shaft is driven directly by the brush motor and the shaft coupling device described above and is fastened directly to the brush support arm on the frame of the vehicle washing apparatus. According to this embodiment, the brush shaft is rotatably mounted on the lower pair of coupling support plates of the shaft coupling device. The brush motor is rigidly mounted on this lower pair of coupling support plates for driving the brush shaft and thereby rotating the brush. The upper pair of coupling support plates then are fastened directly to the brush support arm. In this manner, the separate motor shaft described in the above embodiment is eliminated. As a result, when the brush engages the surfaces of the vehicle, the flexible elastic coupling permits the entire combination of the brush, the brush shaft, the lower coupling support plates and the brush motor to tilt together. The tilting action of the brush causes the flexible elastic coupling to flex or compress which enables the brush assembly to wash one or more of the front, side and rear of the vehicle. In this embodiment, as in the above described embodiment, a shock absorber may be provided to prevent the brush from swinging too freely and two brush assemblies such as described above may be disposed on opposite sides of the vehicle washing apparatus to wash the front, both sides and the rear of the vehicle.

BRIEF DESCRIPTION OF THE DRAWINGS

Other objects and advantages of the invention will become apparent by reference to the more detailed description of the invention and the accompanying drawings which follow, wherein:

FIG. 3 is a side view partly in cross section of the coupling device and the damping cylinder of the first embodiment of the invention as shown in FIG. 2 for preventing the brush from tilting too freely;

FIG. 4 is a side view of the brush assembly shown in FIG. 1 which illustrates the flex of the flexible elastic coupling;

FIGS. 5-8 are top plan views of the vehicle washing apparatus of FIG. 1 illustrating the various positions of the brush assemblies as a vehicle passes through the vehicle washing apparatus;

DETAILED DESCRIPTION OF THE INVENTION

Figure 1:
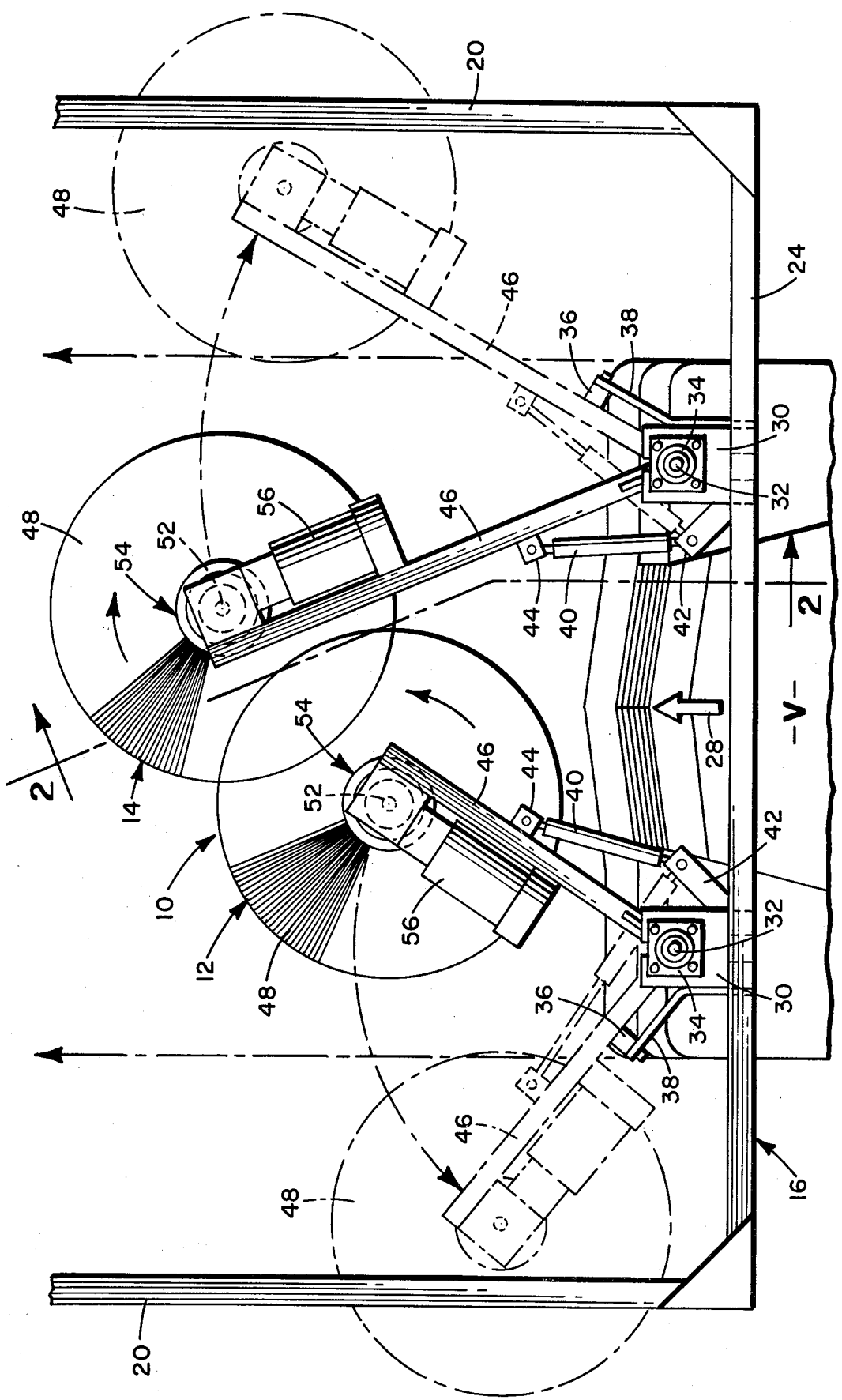
FIG. 1 is a top plan view of a first embodiment of the vehicle washing apparatus according to the invention showing two brush assemblies disposed directly opposite each other on each side of the path of a vehicle to be washed.
Figure 2:
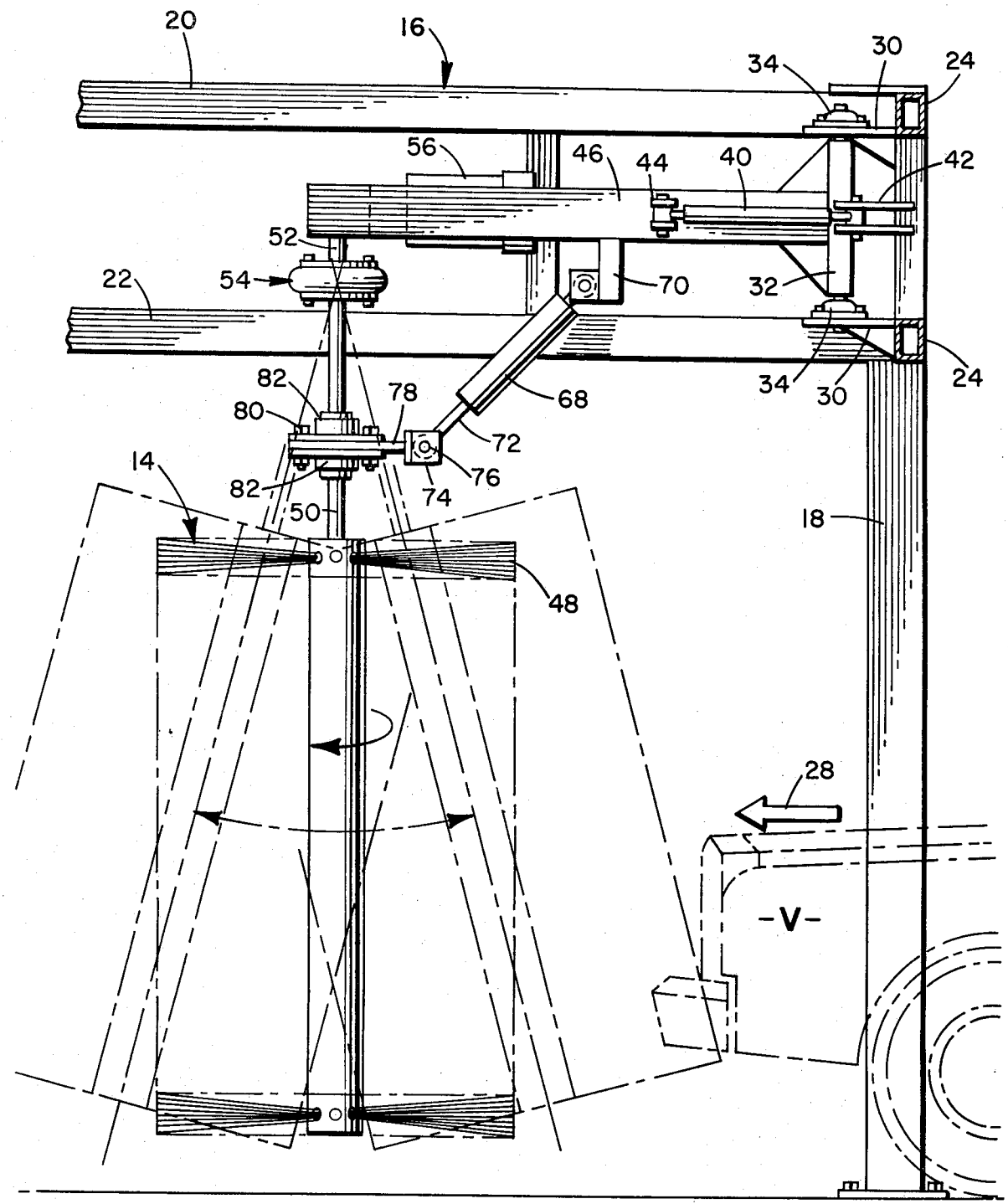
FIG. 2 is a side elevation view of the first embodiment of the vehicle washing apparatus shown in FIG. 1.

Referring now to FIGS. 1 and 2 of the drawings, a vehicle washing apparatus 10 according to a first embodiment of the present invention is shown comprising a pair of brush assemblies 12 and 14 mounted on support frame 16. The support frame 16 includes a plurality of vertical support bars 18 and a pair of longitudinal support bars 20 and 22 on each side of the vehicle washing apparatus. The pair of longitudinal support bars 20 and 22 on each side of the frame 16 are connected by a pair of transverse support bars 24 and 26 on each end of the frame 16. The frame 16 extends over the predetermined path, generally indicated by the arrow 28, of a vehicle to be washed. Although the frame 16 of the embodiment shown in FIGS. 1 and 2 is fixed and the vehicle moves relative thereto, the present invention contemplates the use of a movable frame wherein the vehicle is stationary. Such movable frames are conventional and need not be described in detail herein. The significant consideration in the present invention is the existence of relative movement between the vehicle and the brush assembly mounted on the frame.

The brush assemblies 12 and 14 shown in FIGS. 1 and 2 are pivotably mounted on the transverse support bars 24 and 26 in an overlapping position directly opposite each other on each side of the vehicle washing apparatus. Each of the brush assemblies 12 and 14 is fastened to support plates 30 by a pivot rod 32 which is pivotally mounted on the support plates 30 by bearings 34. As shown by the dotted line positions of the brush assemblies 12 and 14 in FIG. 1, each of the brush assemblies pivot on pivot rods 32 from a position near the center of the passing vehicle to a position along the side of the vehicle. A stopper 36 is fastened to a stopper support arm 38 which is in turn attached to the transverse support bars 24 and 26. This stopper 36 determines the maximum pivot of the brush assemblies 12 and 14 away from the center line of the vehicle washing apparatus. In addition, a suitable shock absorber or damping cylinder 40 regulates and controls the movement of the brush assemblies 12 and 14. The shock absorber or damping cylinder 40 is attached to the transverse support bars 24 and 26 by a bracket 42 and is connected to the brush assemblies 12 and 14 by a bracket 44. The shock absorber 40 is pivotably attached to brackets 42 and 44 in order to permit the shock absorber 40 to pivot with the brush assemblies 12 and 14.

The brush assemblies 12 and 14 each include a brush support arm 46 which is rigidly fastened to the pivot rod 32 for pivotal movement relative to the frame 16. It is noted that the brush support arms 46 of the brush assemblies 12 and 14 are of different lengths in order to enable these brush assemblies 12 and 14 to overlap. It should be recognized that these brush assemblies 12 and 14 may be positioned adjacent each other by providing brush support arms 46 of the same length. A rotating brush 48 is attached to the brush support arm 46 and depends downwardly therefrom for rotational movement about brush shaft 50. The brush shaft 50 is coupled to a motor shaft 52 by a coupling device 54. The motor shaft 52 is pivotably mounted in a fixed position on the brush support arm 46. A brush motor 58 is also mounted on the brush support arm 46 for rotating the brush 48 by driving the motor shaft 52.

The brush 48 preferably is of a type having soft bristles which collapse when the brush is not rotating but which expand outwardly during rotation. Many different designs of the brush 48 may be employed in the present invention in order to increase the washing efficiency of the vehicle washing apparatus. For example, an inverted conical shape may be used rather than the cylindrical shape of the expanded brush shown in FIG. 2. Such an inverted conical shape or other possible shapes conform more closely to the contours of the vehicle.

The details of the coupling device 54 for the embodiment shown in FIGS. 1 and 2 are shown in FIG. 3. The motor shaft 52 is rigidly fastened to the flexible elastic coupling 58 by an upper pair of coupling support plates 60 and fastening bolts 62. Similarly, the brush shaft 50 is rigidly fastened to the flexible elastic coupling 58 by a lower pair of coupling support plates 64 and fastening bolts 66. The flexible elastic coupling 58 is formed by a resilient material such as the rubber which forms an automobile tire. The flexible elastic coupling 58 enables the brush shaft 50 and the brush 48 to tilt or swing in any direction upon engagement with the surfaces of the vehicle.

As illustrated in FIG. 4, the flexible elastic coupling 58 in the coupling device 54 flexes or compresses as the brush 48 engages the vehicle which moves relative to the vehicle washing apparatus. The flexible elastic coupling 58 is capable of flexing or compressing in any direction. This results in different flex or compression forces depending on the position of the brush 48 relative to the surfaces of the vehicle. For example, when the rotating brush 48 contacts the front end of the vehicle, the flexible elastic coupling is flexed or compressed in a direction which enables the flexible elastic coupling 58 to urge the rotating brush 48 around the front corner and along the side of the vehicle. Similarly, the flexible elastic coupling 58 is flexed or compressed in a different direction as the rotating brush 48 passes along the side of the vehicle. This position is illustrated in FIG. 4. As the rotating brush 48 reaches the rear end of the vehicle, the direction of flex or compression of the flexible elastic coupling 58 urges the rotating brush 48 around the rear corner and along the rear end of the vehicle. The flexing action of the flexible elastic coupling 58 cooperates with the rotary reaction force of the rotating brush against the vehicle to cause the rotating brush 48 to move itself around the front, side and rear of the vehicle.

A damping cylinder or shock absorber 68 is shown in FIG. 2 connected between the brush support arm 46 and the brush shaft 50. The shock absorber 68 is pivotally connected to brush support arm 46 by a depending bracket 70. The damping cylinder or shock absorber 68 is pivotably connected to the brush shaft 50 as shown in further detail in FIG. 3. The rod 72 of the damping cylinder or shock absorber 68 is connected to a bracket 74 by a pin 76. This connection permits the damping cylinder 68 to pivot with respect to the bracket 74. The bracket 74 is rigidly fastened to a damping plate 78 which contains an opening through which the brush shaft 50 passes. The damping plate 78 is fastened by bolts 80 to a plurality of bearings 82 which permit the damping plate 78 to freely move relative to the brush shaft 50. As a result, when the rotating brush 48 and the brush shaft 50 tilt on impact with the passing vehicle, the damping plate 78 moves relative to the brush shaft 50 and the damping cylinder or shock absorber 68 pivots relative to both the damping plate 78 and the brush support arm 46. In this manner the damping cylinder or shock absorber 68 regulates and controls the tilting movement of the rotating brush 48 and the brush shaft 50 to prevent the rotating brush 48 from swinging or tilting too freely. In addition, the damping cylinder or shock absorber 68 performs another safety function in the event the flexible elastic coupling 58 malfunctions or breaks. In this event, the above-described connection of the damping cylinder or shock absorber 68 between the brush support arm 46 and the brush shaft 50 prevents the rotating brush 48 and the brush shaft 50 from damaging the vehicle passing through the vehicle washing apparatus.

The operation of the vehicle washing apparatus of the first embodiment of the present invention is best understood by reference to FIGS. 5-9. Beginning with FIG. 5, the brush assemblies 12 and 14 are in their normal operating position whereby the brush support arms 46 position the rotating brushes 48 in the path 28 of the vehicle. These rotating brushes 48 slightly overlap each other to ensure complete washing of the front, sides and rear of the vehicle. This overlapping configuration is accomplished by a brush support arm 46 in the brush assembly 14. As shown in FIG. 5, the rotating brush 48 of the brush assembly 12 already has contacted the front end of the vehicle and, as a result, the brush 48 and the brush shaft 50 are tilted in an outward direction away from the path 28 of the vehicle. The brushes 48 in the brush assemblies 12 and 14 are rotated in a direction whereby the reaction force of the rotating brushes 48 against the vehicle cause the rotating brushes 48 to move along the front end of the vehicle. The movement of the rotating brush 48 in the brush assembly 12 is regulated and controlled by the damping cylinder 40 which is connected between the brush support arm 46 and the transverse support bars 24 and 26 of the frame 16. Similarly, the rotating brush 48 of the brush assembly 14 engages the front end of the vehicle and tilts in an outward direction as illustrated in FIG. 6. The reaction force of the rotating brush 48 of the brush assembly 14 also causes this brush assembly 14 to move along the front end of the vehicle.

The tilting of the brushes 48 upon impact with the front end of the vehicle flexes or compresses the flexible elastic coupling 58 of the coupling device 54. The direction of the flex or compression of the flexible elastic coupling 58 when the brushes 48 of the brush assemblies 12 and 14 engage the front end of the vehicle is such that, as the brush assemblies 12 and 14 reach the front corners of the vehicle, the flex or compression of the flexible elastic coupling 58 urges the rotating brushes 48 along the sides of the vehicle. For example, in FIG. 6, the brush assembly 12 is shown rounding the front corner of the vehicle. In this position, the direction of flex or compression of the flexible elastic coupling 58 has changed relative to the brush support arm 46. This change in the direction of flex of the flexible elastic coupling 58 urges the brush 48 around the front corner and along the side of the vehicle. Similarly, the direction of flex of the flexible elastic coupling 58 in the brush assembly 14 changes as the brush assembly 14 rounds the front corner and passes along the side of the passing vehicle. Again, the outward movement of these brush assemblies 12 and 14 is regulated and controlled by the damping cylinders 40. The maximum outward movement of the brush assemblies 12 and 14 is determined by the stopper 36 and the stopper support arm 38.

Figure 7:
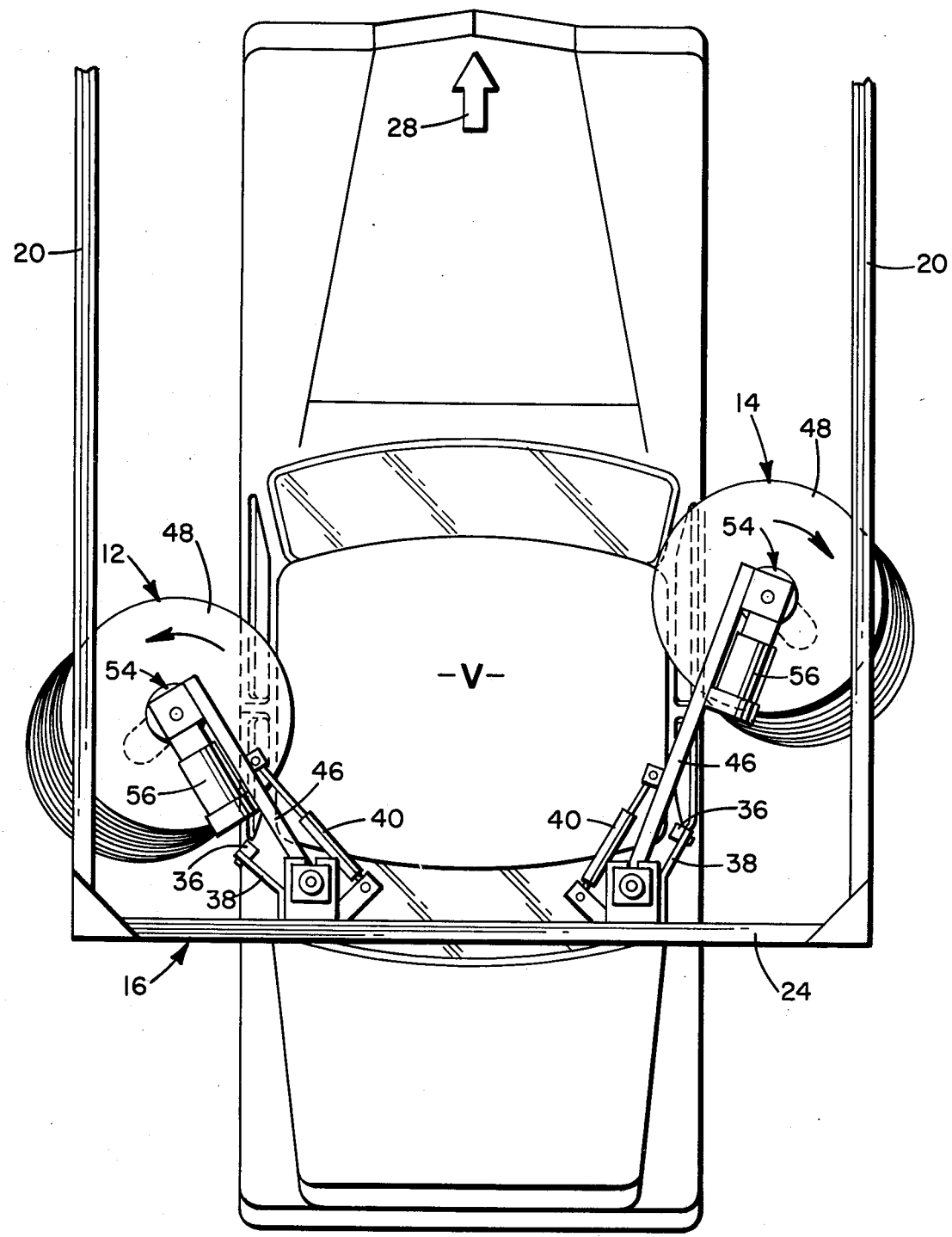

The brush assemblies 12 and 14 pass along the sides of the vehicle as illustrated in FIG. 7. Because of the direction of rotation of the brushes 48, the reaction forces of the rotating brushes 48 against the vehicle cause these rotating brushes 48 to move along the sides of the vehicle. In addition, as shown in FIG. 7, the rotating brushes 48 and the brush shafts 50 of the brush assemblies 12 and 14 are tilted in an outward direction due to the impact between these rotating brushes 48 and the sides of the vehicle. The outward tilting of these rotating brushes 48 flexes or compresses the flexible elastic couplings 58 in the brush assemblies 12 and 14 in the manner shown.

Figure 8:
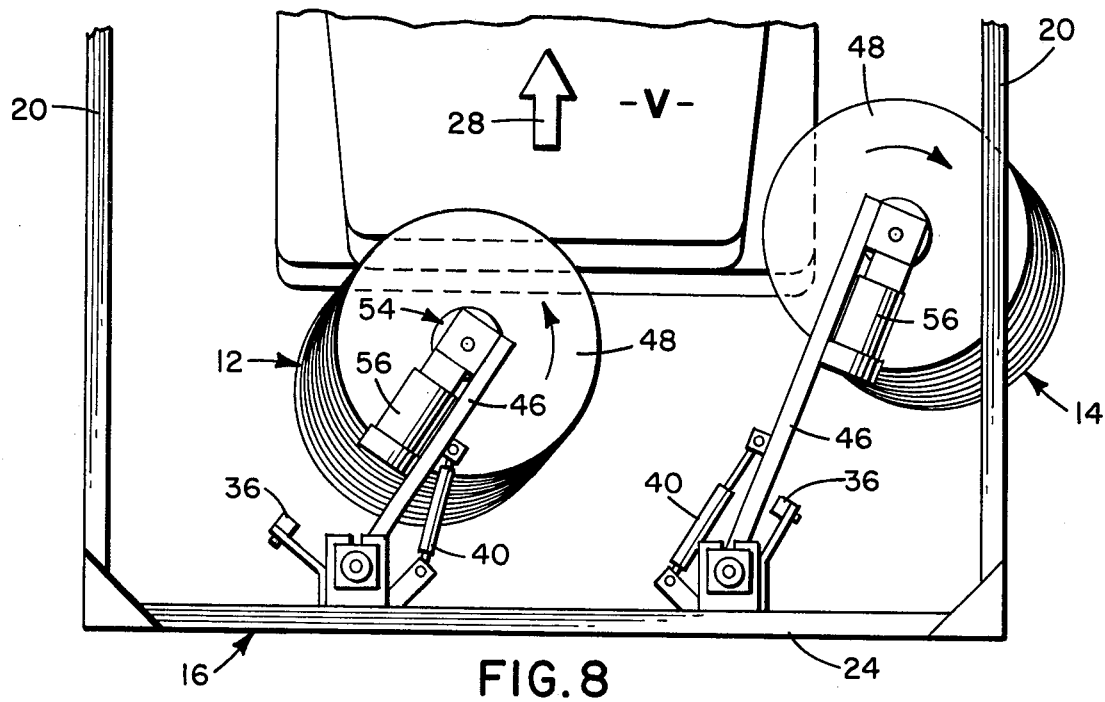
Figure 9:
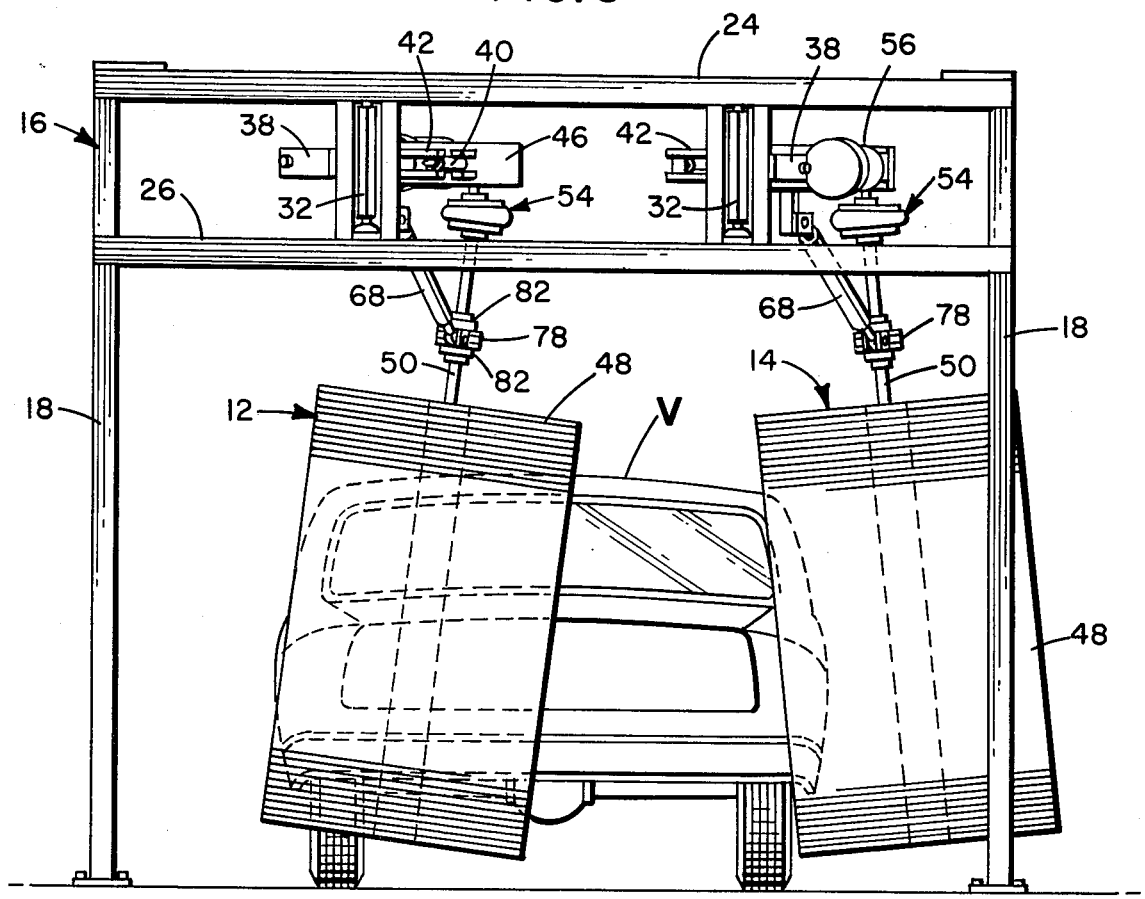
FIG. 9 is rear end elevation view of the vehicle washing apparatus shown in FIGS. 1 and 8.

When the brush assemblies 12 and 14 reach the rear corners of the vehicle as illustrated in the top view of FIG. 8 and the rear end view of FIG. 9, the flex or compression of the flexible elastic couplings 58 urges the brush assemblies 12 and 14 around the rear corners and along the rear end of the vehicle. The flex or compression of these flexible elastic couplings 58 cooperates with the reaction force of the rotating brush 48 against the vehicle to cause the rotating brushes 48 to wash the rear end of the passing vehicle. For example, as shown in FIGS. 8 and 9, the brush assembly 14 is positioned on one of the rear corners of the vehicle while the other brush assembly 12 is passing along the rear end of the vehicle. The degree of flex or compression of the flexible elastic coupling 58 in the outward direction changes as illustrated by a comparison between the brush assemblies 12 and 14. This flex or compression of the flexible elastic couplings 58 urges the brushes 48 and the brush shafts 50 toward their normal operating position such as shown in FIG. 2. Finally, the brush assemblies 12 and 14 return to their normal overlapping position to ensure an effective cleaning of the entire rear end of the vehicle. The vehicle washing apparatus then is prepared to wash the next vehicle.

Figure 10:
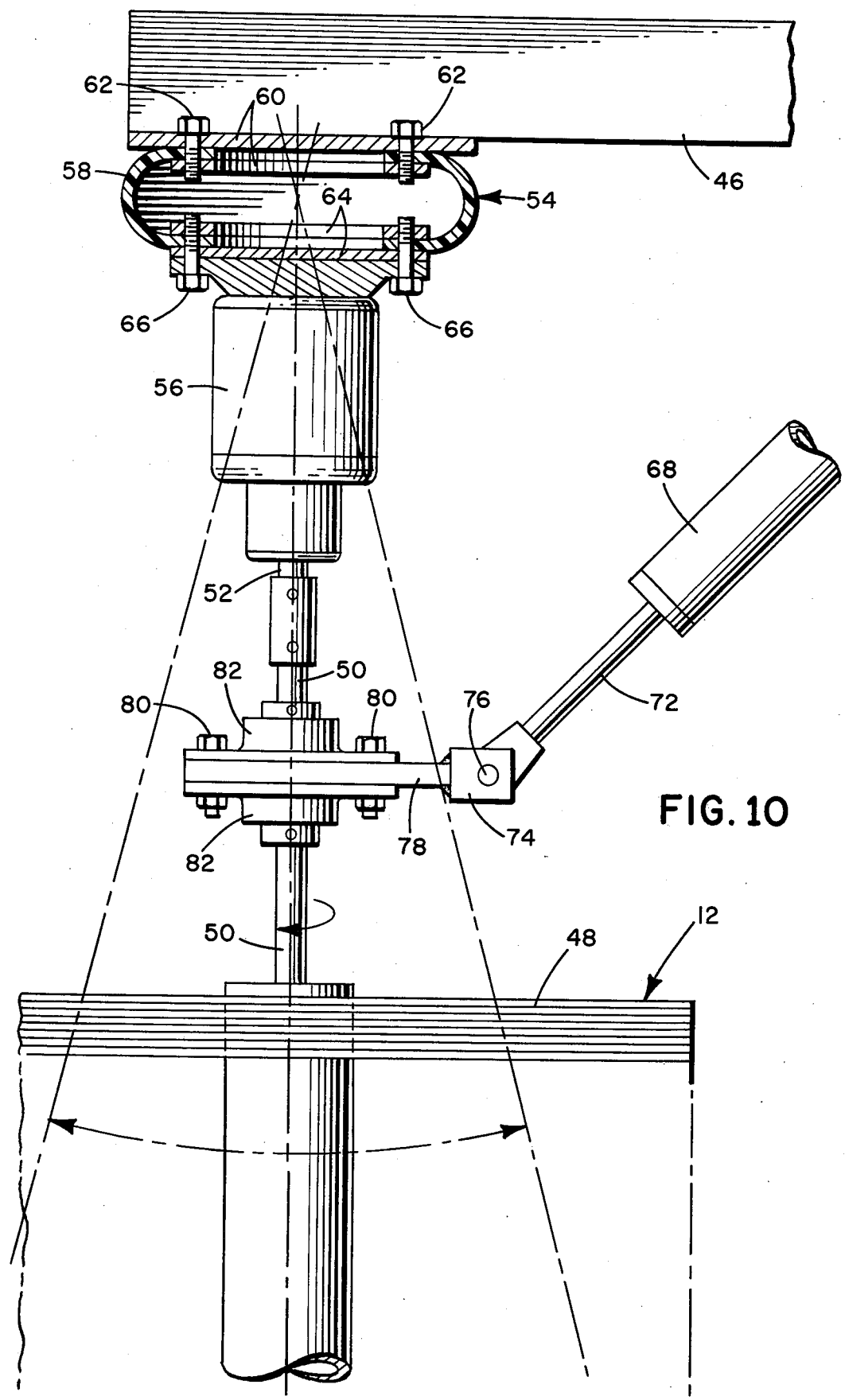
FIG. 10 is a side view partly in cross section of a second embodiment of the brush assembly of the present invention.

Referring now to FIG. 10 of the drawings, a brush assembly according to a second embodiment of the present invention is shown. Since this second embodiment is similar in most respects to the first embodiment as shown in FIGS. 1-3, the same numerals are used to designate like parts. Also, because the top and side views of this second embodiment are the same as the top and side views of the first embodiment shown in FIGS. 1 and 2 except for several minor modifications such as the different position of the brush motor 56, no such views of this second embodiment are included.

The second embodiment of the brush assembly 12 shown in FIG. 10 includes a brush support arm 46 connected to the frame 16 in the same manner as described with respect to FIGS. 1 and 2. However, unlike the first embodiment, the coupling device 54 is fastened directly to the brush support arm 46 in the manner shown in FIG. 10. The coupling device 54 includes an upper pair of coupling support plates 60 which are bolted directly to the brush support arm 46. The coupling device 54 further includes a lower pair of coupling support plates 64 which are fastened to the flexible elastic coupling 58 by bolts 66. The lower pair of coupling support plates 64 support the brush motor 56 and the brush shaft 50 which is rotatably supported by the brush motor 56. The brush motor 56 drives the brush shaft 50 and the brush 48. A damping cylinder or shock absorber 68 is also connected between the brush shaft 50 and the brush support arm 46 in the manner described above in the first embodiment.

The operation of the second embodiment of the brush assembly 12 is similar to the operation of the first embodiment as described above with respect to FIGS. 4-9. The flexible elastic coupling 58 flexes or compresses as the brush 48 engages the surfaces of the vehicle. Since the flexible elastic coupling 58 is capable of flexing or compressing in any direction, different flex or compression forces occur depending on the position of the brush 48 relative to the surfaces of the vehicle. However, unlike the first embodiment, the coupling device 54 is fixed relative to the brush support arm 46 and the brush shaft 50 rotates relative to the coupling device 54. The entire combination of the lower pair of coupling plates 64, the brush motor 56, the brush shaft 50 and the brush 48 tilts or swings upon engagement of the brush assembly 12 with the surfaces of the vehicle. Although this embodiment of the present invention achieves all the same objectives as the first embodiment, it is simpler in design and operation.

An additional feature of both the above described embodiments of the present invention is that the vehicle can move relative to the brush assamblies 12 and 14 in the direction 28 shown in FIGS. 5-9 as well as the opposite direction. The only adjustment which is required in order to change the direction of the vehicle relative to the brush assemblies 12 and 14 is to reverse the direction of rotation of the brushes 48. No adjustment of the position of the brush support arms 46 is necessary in order to adapt the brush assemblies 12 and 14 of the present invention to a vehicle moving in a different direction relative thereto.

Another feature of the present invention which is apparent from the drawings is the absence of a vehicle track for guiding the vehicle through the brush assemblies 12 and 14. As a result, dual wheeled vehicles can be easily accomodated by the disclosed vehicle washing apparatus. Furthermore, because of the flexibility of the flexible elastic coupling 58 of the coupling device 54, the brush assemblies 12 and 14 can accomodate a vehicle even though it is not exactly centered as shown in FIGS. 5-9. In this regard, safety or guide rails can be provided adjacent the sides of the frame 16 to ensure that the position of the vehicle relative to the frame 16 and the brush assemblies 12 and 14 is within predetermined tolerances.

The advantages of the present invention are readily apparent from the description above. The use of a flexible elastic coupling for coupling the rotating brushes to their respect support arms permits the construction of a simple vehicle washing apparatus which is not only economical but which may be incorporated into an extremely compact and small unit. An effective cleaning action is provided without resort to complicated power control systems such as hydraulic systems to operate the rotating brushes. Such a simple and compact unit is easy to operate and requires a minimum of supervision and maintenance. Moreover, the flexible elastic coupling of the present invention can be used on existing brush assemblies as an improvement.

Although the present invention has been illustrated and described with reference to a specific embodiment, it will be understood that various modifications may be made by persons skilled in the art without departing from the spirit of the invention which is defined solely by the claims. For example, although the brush assembly has been described as including a brush support art 46 rotatably connected to the frame 16, it is to be understood that the present invention is not so limited. Various other techniques may be employed by those of ordinary skill in the art for connecting the brush assembly to the supporting frame such as a suspension chain, an additional flexible coupling, etc.

I claim:
1. In a vehicle washing apparatus having a support frame, a brush assembly supported by said frame for washing one or more of the front, side and rear of a vehicle moving relative thereto comprising:
   brush support means connected to said frame;
   a brush for washing the vehicle moving relative thereto;
   a shaft for supporting said brush in a normal operating position;
   a coupling device for coupling said shaft to said brush support means, said coupling device comprising flexible coupling means responsive to the force of the vehicle against said brush for flexing freely in any direction to tilt said brush, said flexible coupling means, upon flexing in any direction, further generating a restoring force equal in all directions to urge said brush toward its normal operating position; and
   motor means coupled to said shaft for rotating said shaft and said brush in the opposite direction at the surface of the vehicle to the direction of movement of said brush assembly relative to the vehicle to generate a rotary reaction force against the vehicle which walks said brush along the surfaces of the vehicle, said motor means cooperating with said flexible coupling means by generating a rotary reaction force which adds to the restoring force caused by the flex of said flexible coupling means to walk said brush around one or more of the front, side and rear surfaces of the vehicle to thereby wash the vehicle.

2. The vehicle washing apparatus defined in claim 1 wherein said brush assembly is a wrap-around brush assembly for washing the front, side and rear of the vehicle.

3. The vehicle washing apparatus defined in claim 1 wherein said flexible coupling means is elastic.

4. The vehicle washing apparatus defined in claim 1 wherein the flex of said flexible coupling means cooperates with the rotary reaction force of said brush against the front and side of the vhicle to cause said brush to move itself around the front and rear corners of the vehicle, respectively.

5. The vehicle washing apparatus defined in claim 1 wherein said brush assembly further comprises safety means connected between said shaft and said brush support means for preventing said brush and said shaft from damaging the vehicle in the event said flexible coupling means breaks.

6. The vehicle washing apparatus defined in claim 1 wherein said brush assembly further comprises safety means for preventing said brush and said shaft from tilting too freely.

7. The vehicle washing apparatus defined in claim 6 wherein said safety means comprise a shock absorber connected between said brush support means and said shaft.

8. The vehicle washing apparatus defined in claim 7 wherein one end of said shock absorber is pivotably connected to said brush support means and the other end is pivotably connected to a plate which is mounted on said shaft by a plurality of bearings to permit said shaft to rotate.

9. The vehicle washing apparatus defined in claim 1 wherein said brush is shaped to conform to the contour of the vehicle.

10. In a vehicle washing apparatus having a supporting frame, a brush assembly supported by said frame for washing one or more of the front, side and rear of a vehicle moving relative thereto comprising:

a brush support arm pivotably mounted on said frame at one end of said brush support arm;

a brush for washing the vehicle moving relative thereto;

a shaft for supporting said brush in a normal operating position;

a coupling device for coupling said shaft to said brush support arm, said coupling device comprising flexible coupling means responsive to the force of the vehicle against said brush for flexing in any direction to tilt said brush, said flexible coupling means, upon flexing in any direction, further generating a restoring force equal in all directions to urge said brush toward its normal operating position; and motor means coupled to said shaft for rotating said shaft and said brush in the opposite direction at the surface of the vehicle to the direction of movement of said brush assembly relative to the vehicle to generate a rotary reaction force against the vehicle which walks said brush along the surfaces of the vehicle, said motor means cooperating with said flexible coupling means by generating a rotary reaction force which adds to the restoring force caused by the flex of said flexible coupling means to walk said brush around one or more of the front, side and rear surfaces of the vehicle.

11. The vehicle washing apparatus defined in claim 10 wherein said brush assembly is a wrap-around brush assembly for washing the front, side and rear of the vehicle.

12. The vehicle washing apparatus defined in claim 10 wherein said flexible coupling means is elastic.

13. The vehicle washing apparatus defined in claim 10 wherein said brush assembly further comprises safety means connected between said shaft and said brush support arm for preventing said brush and said shaft from damaging the vehicle passing through said vehicle washing apparatus in the event said flexible coupling means breaks.

14. The vehicle washing apparatus defined in claim 10 wherein said brush assembly further comprises safety means for preventing said brush and said shaft from tilting too freely.

15. The vehicle washing apparatus defined in claim 14 wherein said safety means comprise a shock absorber connected between said brush support arm and said first shaft.

16. In a vehicle washing apparatus having a supporting frame, a brush assembly supported by said frame for washing one or more of the front side and rear of a vehicle moving relative thereto comprising:

a brush support arm pivotably mounted on said frame at one end of said brush support arm;

a first shaft pivotably mounted at the other end of said brush support arm;

motor means mounted on said brush support arm for rotating said first shaft;

a brush for washing the vehicle moving relative thereto;

a second shaft for supporting said brush in a normal operating position; and a coupling device for coupling said first and second shafts together to transmit the rotation of said first shaft to said second shaft and said brush, said coupling device comprising flexible coupling means responsive to the force of the vehicle against said brush for flexing freely in any direction to tilt said brush, said flexible coupling means, upon flexing in any direction, further generating a restoring force equal in all directions to urge said brush toward its normal operating position, wherein said motor means rotates said brush in the opposite direction at the surface of the vehicle to the direction of movement of said brush assembly relative to the vehicle to generate a rotary reactive force against the vehicle which walks said brush along the surfaces of the vehicle, said motor means cooperating with said flexible coupling means by generating a rotary reaction force which adds to the restoring force caused by the flex of said flexible coupling means to walk said brush around one or more of the front, side and rear surfaces of the vehicle.

17. The vehicle washing apparatus defined in claim 16 wherein said brush assembly is a wrap around brush assembly for washing the front, side and rear of the vehicle.

18. The vehicle washing apparatus defined in claim 16 wherein said flexible coupling means is elastic.

19. The vehicle washing apparatus defined in claim 16 wherein said coupling device further comprises first and second support plate means rigidly secured to said first and second shafts, respectively, for fastening said flexible coupling means to said first and second shafts.

20. The vehicle washing apparatus defined in claim 16 wherein said brush assembly further comprises safety means connected between said second shaft and said brush support arm for preventing said brush and said second shaft from damaging the vehicle passing through said vehicle washing apparatus in the event said flexible coupling means breaks.

21. The vehicle washing apparatus defined in claim 16 wherein said brush assembly further comprises safety means for preventing said brush and said second shaft from tilting too freely, said safety means comprising a shock absorber connected between said brush support arm and said second shaft, wherein one end of said shock absorber is pivotably connected to said brush support arm and the other end is pivotably connected to a plate which is mounted on said second shaft by a plurality of bearings to permit said second shaft to rotate.

22. In a brush assembly for a vehicle washing apparatus including support means, a shaft, a brush mounted on said shaft and a motor coupled to said shaft for rotating said shaft and said brush to wash a vehicle moving relative thereto, a coupling device for coupling said shaft to said support means comprising:

flexible means connecting said shaft to said support means for flexing freely in any direction, said flexible means being responsive to the force of the vehicle against said brush to tilt said brush in any direction relative to a normal position, said flexible coupling means, upon flexing in any direction, further generating a restoring force equal in all directions to urge said brush toward its normal position, wherein said motor rotates said brush in the opposite direction at the surface of the vehicle to the direction of movement of said brush assembly relative to the vehicle to generate a rotary reactive force against the vehicle which walks said brush along the surfaces of the vehicle, said motor means cooperating with said flexible coupling means by generating a rotary reaction force which adds to the restoring force caused by the flex of said flexible means to walk said brush around one or more of the front, side and rear surfaces of the vehicle.

23. The brush assembly defined in claim 22 wherein said brush assembly is a wrap-around brush assembly for washing the front, side and rear of the vehicle.

24. The brush assembly defined in claim 22 wherein said flexible means is elastic.

25. The brush assembly defined in claim 22 wherein said coupling device further comprises support plate means for fastening said flexible means between said shaft and said support means.

26. The brush assembly defined in claim 22 wherein the flex of said flexible means cooperates with the rotary reaction force of said brush against the front and side of the vehicle to cause said brush to move itself around the front and rear corners of the vehicle, respectively.

27. A vehicle washing apparatus for washing a vehicle moving relative thereto comprising:
a frame;
a pair of rotating brush assemblies mounted on opposite sides of said frame, each of said brush assemblies comprising:
a brush support arm pivotably mounted on said frame at one end of said brush support arm;
a brush for washing the vehicle moving relative thereto;
a shaft for supporting said brush in a normal operating position;
a coupling device for coupling said shaft to said brush support arm, said coupling device comprising flexible coupling means responsive to the force of the vehicle against said brush for flexing freely in any direction to tilt said brush, said flexible coupling means, upon flexing in any direction, further generating a restoring force equal in all directions to urge said brush toward its normal operating position; and
motor means coupled to said shaft for rotating said shaft and said brush in the opposite direction at the surface of the vehicle to the direction of movement of said brush assembly relative to the vehicle to generate a rotary reaction force against the vehicle which walks said brush along the surfaces of the vehicle, said motor means cooperating with said flexible coupling means by generating a rotary reaction force which adds to the restoring force caused by the flex of said flexible coupling means to walk said brush along one or more of the front, side and rear surfaces of the vehicle to thereby wash the vehicle.

28. The vehicle washing apparatus defined in claim 27 wherein each of said brush assemblies further comprises safety means connected between said shaft and said brush support arm for preventing said brush and said shaft from damaging the vehicle in the event said flexible coupling means breaks.

29. The vehicle washing apparatus defined in claim 27 wherein each of said brush assemblies further comprises safety means for preventing said brush and said shaft from tilting too freely.

30. The vehicle washing apparatus defined in claim 27 wherein said brush support arm in one of said brush assemblies is of a different length than the brush support arm in the other of said brush assemblies to position said brush assemblies in an overlapping relationship near the center line of the vehicle.

31. The vehicle washing apparatus defined in claim 27 wherein the vehicle washing apparatus is stationary and the vehicle is moved through said vehicle washing apparatus.

32. The vehicle washing apparatus defined in claim 31 wherein the vehicle is driven through said vehicle washing apparatus and said vehicle washing apparatus further comprises guide rails for guiding the vehicle through said brush assemblies.

* * * * *